's Patent Number: 4,893,870
Date of Patent: Jan. 16, 1990

United States Patent [19]
Moriya et al.

[54] DRIVE APPARATUS OF A ROOF STRUCTURE FOR A VEHICLE

[75] Inventors: Masaichi Moriya; Masaaki Miyamoto; Kazumi Nakahara; Junichi Maekawa, all of Yokohama, Japan

[73] Assignee: Ohi Seisakusho Co., Ltd., Yokohama, Japan

[21] Appl. No.: 352,624

[22] Filed: May 15, 1989

Related U.S. Application Data

[63] Continuation of Ser. No. 96,536, Sep. 15, 1987, abandoned.

[30] Foreign Application Priority Data

Sep. 25, 1986 [JP] Japan .................................. 61-226603
Jan. 16, 1987 [JP] Japan .................................. 62-3599
Feb. 13, 1987 [JP] Japan .................................. 62-29821

[51] Int. Cl.⁴ .............................................. B60J 7/057
[52] U.S. Cl. ...................................................... 296/223
[58] Field of Search .............. 296/223; 200/573, 30 R

[56] References Cited

U.S. PATENT DOCUMENTS

| | | | |
|---|---|---|---|
| 4,272,125 | 6/1981 | Bienert et al. ........................ | 296/223 |
| 4,329,594 | 5/1982 | Bohm .............................. | 296/223 X |
| 4,420,185 | 12/1983 | Bienert et al. ........................ | 296/223 |
| 4,468,063 | 8/1984 | Yukimoto et al. ................... | 296/223 |
| 4,531,777 | 7/1985 | Bienert et al. ........................ | 296/223 |
| 4,561,691 | 12/1985 | Kawai et al. ...................... | 296/223 X |
| 4,600,818 | 7/1986 | Eto .................................... | 200/153 T |
| 4,629,953 | 12/1986 | Inoue et al. ....................... | 296/223 X |
| 4,659,141 | 4/1987 | Masuda et al. ....................... | 296/223 |
| 4,727,227 | 2/1988 | Faini .................................. | 200/153 T |

FOREIGN PATENT DOCUMENTS

| | | | |
|---|---|---|---|
| 1505611 | 7/1970 | Fed. Rep. of Germany ...... | 296/223 |
| 58-214414 | 12/1983 | Japan . | |
| 0186733 | 10/1984 | Japan .................................. | 296/223 |
| 2082247 | 3/1982 | United Kingdom . | |
| 2147432 | 5/1985 | United Kingdom . | |

*Primary Examiner*—Dennis H. Pedder
*Attorney, Agent, or Firm*—Foley & Lardner, Schwartz, Jeffery, Schwaab, Mack, Blumentahl & Evans

[57] ABSTRACT

A drive apparatus of a roof structure for a vehicle comprises a drive gear rotatably supported by a casing of the apparatus; a first gear for transmitting the power from the drive gear to a drive section for opening and closing a lid disposed in the roof structure; a rotary member having a control section for switching a switch for detecting the position of the lid; and a second gear for transmitting the power from the drive gear to the rotary member. The drive apparatus has a control device for controlling a drive motor for driving the roof structure. The control device comprises a drive motor for slidably and tiltably driving the lid disposed in a roof opening by the normal and reverse rotations of the motor; a tilting control circuit having first and second tilting contacts disposed in a first switch, and tilting the lid by driving the drive motor in the normal and reverse directions by switching the first and second tilting contacts when the first switch is operated; a sliding control circuit having first and second sliding contacts disposed in a second switch, and sliding the lid by driving the drive motor in the normal and reverse directions by switching the first and second sliding contacts when the second switch is operated; and a switch device for electrically connecting and disconnecting the tilting control circuit and the sliding control circuit by a cam rotated by the drive motor in the normal and reverse directions.

5 Claims, 29 Drawing Sheets

FIG.29

|  | TILT | CLOSE | M | OPEN |
|---|---|---|---|---|
| SWITCH 335 | ▨▨▨ | | ▲ | |
| SWITCH 336 | ▨ | ▨▨ | | ▨ |
| POSITION SIGNAL | (1,1) | (0,0) | (1,0) | (0,1) |

DRIVE APPARATUS OF A ROOF STRUCTURE FOR A VEHICLE

This application is a continuation of application Ser. No. 07/096,536, filed Sept. 15, 1987, abandoned.

The present invention relates to a drive apparatus of a sunroof structure for a vehicle, and in particular, to a drive apparatus for opening and closing a lid disposed in the sunroof structure.

BACKGROUND OF THE INVENTION

In the conventional sunroof for a vehicle for example, an apparatus for opening and closing a lid in the sunroof comprises a first transmission system for transmitting the rotational power of a drive motor to drive cables of the lid, and a second transmission system for transmitting the power to a rotary body provided with control surfaces for turning on and off detecting switches for detecting the opening and closing positions of the lid.

As disclosed in Japanese Laid-Open Patent No. 58-214414, the rotary body driven by the second transmission system is disposed on the axis of a drive shaft driven by a drive motor and a plurality of detecting switches are arranged in proximity to the control surfaces of the rotary body.

The rotary body is disposed on the axis of the drive shaft as mentioned above, and the rotary body and the respective switches, which are turned on and off by the control surfaces of the rotary body, are projected upwards from the casing of the apparatus, so that the height of the rotary body and therefore the thickness of the entire apparatus could become thick. In particular, the drive apparatus is desirably as thin as possible since the apparatus is disposed within a housing space between outer and inner panels of the roof. However, as the entire apparatus becomes thick as mentioned above, it is necessary to secure the increased housing space therefor so that the ceiling of the compartment must be lowered in height.

To solve this problem, it is considered to separately dispose a transmission gear in the first transmission gear system for transmitting the power to the drive cables of the lid and take out the power by engaging the separate transmission gear with the second transmission gear system. In such a structure, it is possible to reduce the thickness of the apparatus along the axis of the drive shaft, but a region for the separate transmission gear is increased in thickness since the separate transmission gear is disposed downward from the first transmission gear system. The region for the transmission gear is located at a place at which a discharging tray crosses in the widthwise direction of the vehicle and the thickness of the separate transmission gear is thus restricted, so that it is not desirable in structure to separately dispose such a transmission gear, and the height of the ceiling of the compartment could be reduced as mentioned above.

The plurality of detecting switches have switch terminals capable of contacting the control surfaces of the rotary body and are arranged around the rotary body for sliding and tilting the lid. In this case, it is necessary to position the respective detecting switches in predetermined positions in which the opening and closing positions of the lid are properly detected, and the respective detecting switches are attached into the apparatus while positioning the switches at predetermined places one by one. Therefore, the switches must be carefully attached and the assembly thereof is not easy and an error in assembly tends to be generated.

Further, in the conventional drive apparatus in which the lid is open and closed by moving the drive cables, a large load is applied to the drive motor when a foreign matter jams the lid and stops the operation of the lid. To solve this problem, as in Japanese Laid-Open Patent No. 58-214414, when the lid is stopped in an intermediate position between the opening and closing positions, the transmission path is interrupted by generating a slip therein by a frictional clutch so as not to apply an excessive load to the drive motor.

FIG. 1 shows the conventional drive apparatus in which a main shaft 103 is supported at both ends thereof by a casing body 101 and is slidable along the axial direction. A main gear 107 is engaged with a worm gear 105 which is an output gear of a drive motor. A driven gear 113 is connected to drive cables 109 of the lid through a transmission mechanism 111. The main gear 107 and the driven gear 113 are mounted on the main shaft 103. The main gear 107 is located between upper and lower clutch plates 106, 106 integral with the main shaft 103. A clutch spring 115 is disposed between the main gear 107 and the driven gear 113 to control the transmitted force therebetween. The driven gear 113 is integrally coupled to the main shaft 103.

In the apparatus shown in FIG. 1, the force transmitted to the driven gear 113 is controlled by adjusting the elastic pressure of the clutch spring 115. The elastic pressure of the clutch spring 115 is increased as the main gear 107 and the driven gear 113 approach each other, thereby increasing the coupling force of the clutch plate 106. The elastic pressure of the clutch spring 115 is decreased as the main gear 107 and the driven gear 113 are separated from each other, decreasing the coupling force of the clutch plate 106. The main gear 107, together with the main shaft 103, approach and are separated from the driven gear 113 in the axial direction by tightening and untightening a nut 119 screwed onto a screw portion 117 formed on the main shaft 103. In this case, it is necessary to fix the main shaft 103 so as not to be rotated when the nut 119 is rotated. Therefore, in the conventional apparatus, a tool engaging groove 125 is disposed in a gear shaft 123 spline-engaged with an intermediate gear 121, and the nut 119 is rotated while a tool 127 is inserted into the tool engaging groove 125 to prevent the rotation of the main shaft 103.

According to the conventional apparatus mentioned above, after the apparatus has been assembled, it is very complicated to adjust and set the elastic pressure of the clutch spring 115 to a predetermined value. Further, it is necessary to spline-fit the intermediate gear 121 and the gear shaft 123 to each other, and rotatably support both ends of the gear shaft 123 by bearings, which are unfavorable in processing and assembly.

Further, in the conventional drive apparatus having a control device for opening and closing the lid, the lid of the sunroof is open and closed when necessary, and a means for operating the sunroof must actuate the lid from various states thereof to a predetermined state which a user wants. However, in such means, it is generally necessary to perform complicated operations to selectively actuate the lid in a plurality of operating states and push a switch again in boundary states between the operating states in consideration of the present state of the lid.

In Japanese Laid-Open Patent No. 60-199183, another control device in the drive apparatus has been proposed to solve this problem. In this control device, the state of a lid is provided by a bit signal which is stored in a bit memory, and the operation of the sunroof is controlled in accordance with the stored data. The control device is provided with a backup power device for maintaining the bit memory in the stored state at any time such that the stored data are not deleted.

However, in such a conventional control device of the sunroof, the state of the lid is once stored as a bit signal in the bit memory and the operation of the sunroof is controlled on the basis of the stored memory so that the inputting and outputting of the bit information with respect to the bit memory are fundamentally complicated, thereby making it necessary to provide a complicated electrical means. Further, since the bit memory plays an important role in this control device, the backup power source is required to maintain the bit information so that the control device is complicated and expensive as a whole.

SUMMARY OF THE INVENTION

To overcome the problems mentioned above, an object of the present invention is to provide a drive apparatus of a roof structure for a vehicle in which the apparatus is thin and the detecting accuracy of detecting switches is improved and the assembly thereof is facilitated.

Another object of the present invention is to provide a drive apparatus of a roof structure for a vehicle in which the elastic pressure of a clutch spring is easily adjusted and the apparatus is easily processed and assembled.

Another object of the present invention is to provide a control device of a roof structure for controlling the opening and closing of a lid by simple and reliable mechanism and structure.

With the above objects in view, the present invention resides in a drive apparatus of a roof structure for a vehicle, said apparatus comprising drive gear means rotatably supported by a casing of the apparatus; first gear means for transmitting the power from the drive gear means to a drive section for opening and closing a lid disposed in the roof structure; a rotary member having a control section for switching switch means for detecting the position of the lid; and second gear means for transmitting the power from the drive gear means to the rotary member.

The drive gear means in the drive apparatus comprises a main shaft rotatably supported by the casing and movable in the axial direction thereof, a main gear driven by a drive motor, a second gear coupled to the main gear through a clutch member and transmitting the power from the main gear to said lid through the first gear means, an adjusting portion disposed at one end of the main shaft in the axial direction thereof and adjusting the coupling force of the clutch member, and an engaging portion disposed at the other end of the main shaft in the axial direction thereof and engagable with a jig.

The drive apparatus has a control device for controlling the drive motor for driving the roof structure. The control device comprises the drive motor for slidably and tiltably driving the lid disposed in a roof opening by the normal and reverse rotations of the motor; a tilting control circuit having first and second tilting contacts disposed in a first switch, and tilting the lid by driving the drive motor in the normal and reverse directions by switching the first and second tilting contacts when the first switch is operated; a sliding control circuit having first and second sliding contacts disposed in a second switch, and sliding the lid by driving the drive motor in the normal and reverse directions by switching the first and second sliding contacts when the second switch is operated; and switch means for electrically connecting and disconnecting the tilting control circuit and the sliding control circuit by cam means rotated by the drive motor in the normal and reverse directions.

BRIEF DESCRIPTION OF THE DRAWINGS

The present invention will be more apparent from the following description of the preferred embodiments thereof in conjunction with the accompanying drawings in which:

FIG. 29 is a view showing the relation between position detecting switches and input signals transmitted to a judging device.

DETAILED DESCRIPTION OF THE PREFERRED EMBODIMENTS

The preferred embodiments of the present invention will now be described with reference to the drawings.

Figure 1:
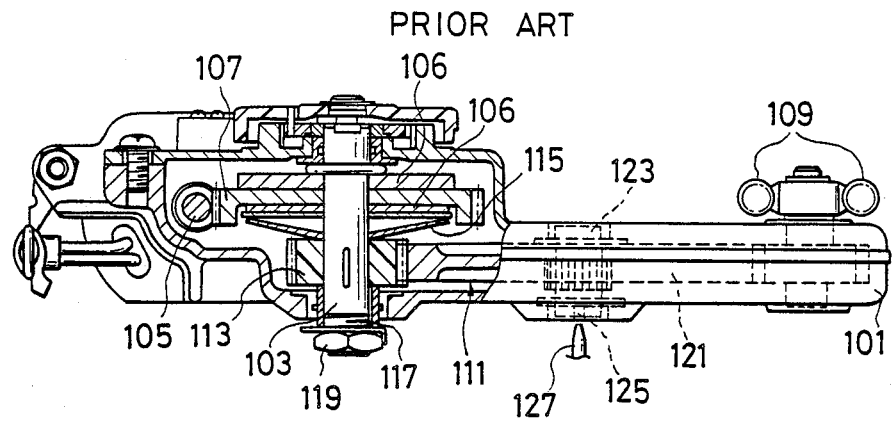
FIG. 1 is a sectional view of the conventional drive apparatus.
Figure 2:
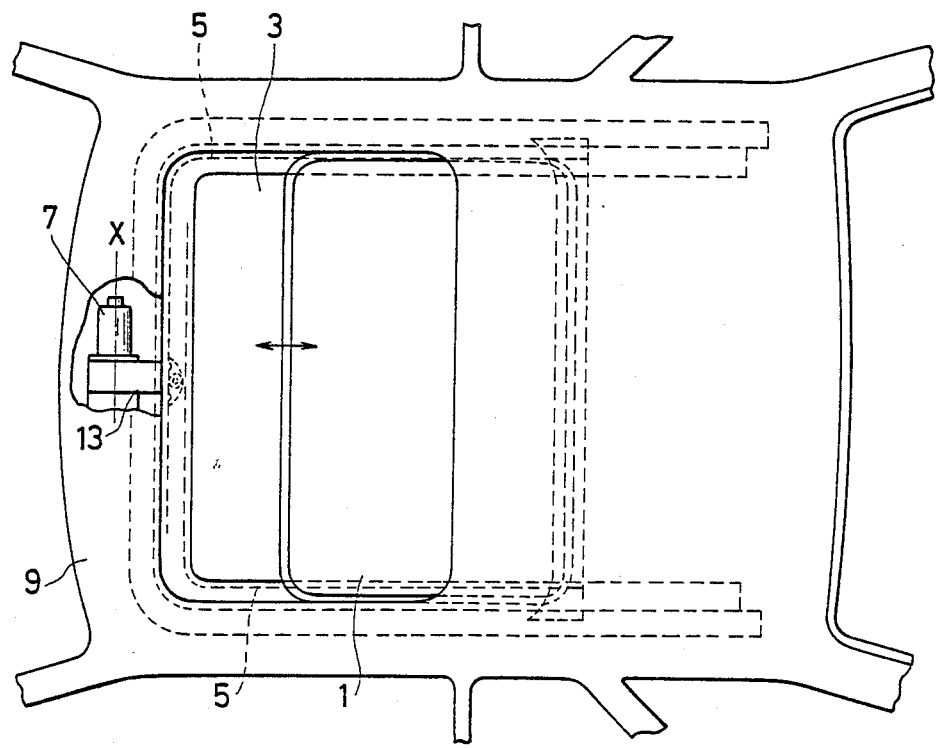
FIG. 2 is a plan view showing a state in which a drive apparatus is attached to a roof structure for a vehicle according to the present invention.

In FIG. 2, a lid 1 is disposed in a roof opening 3 and is driven by a drive motor 7 through a pair of drive wires 5, 5 having a gear portion.

Figure 3:
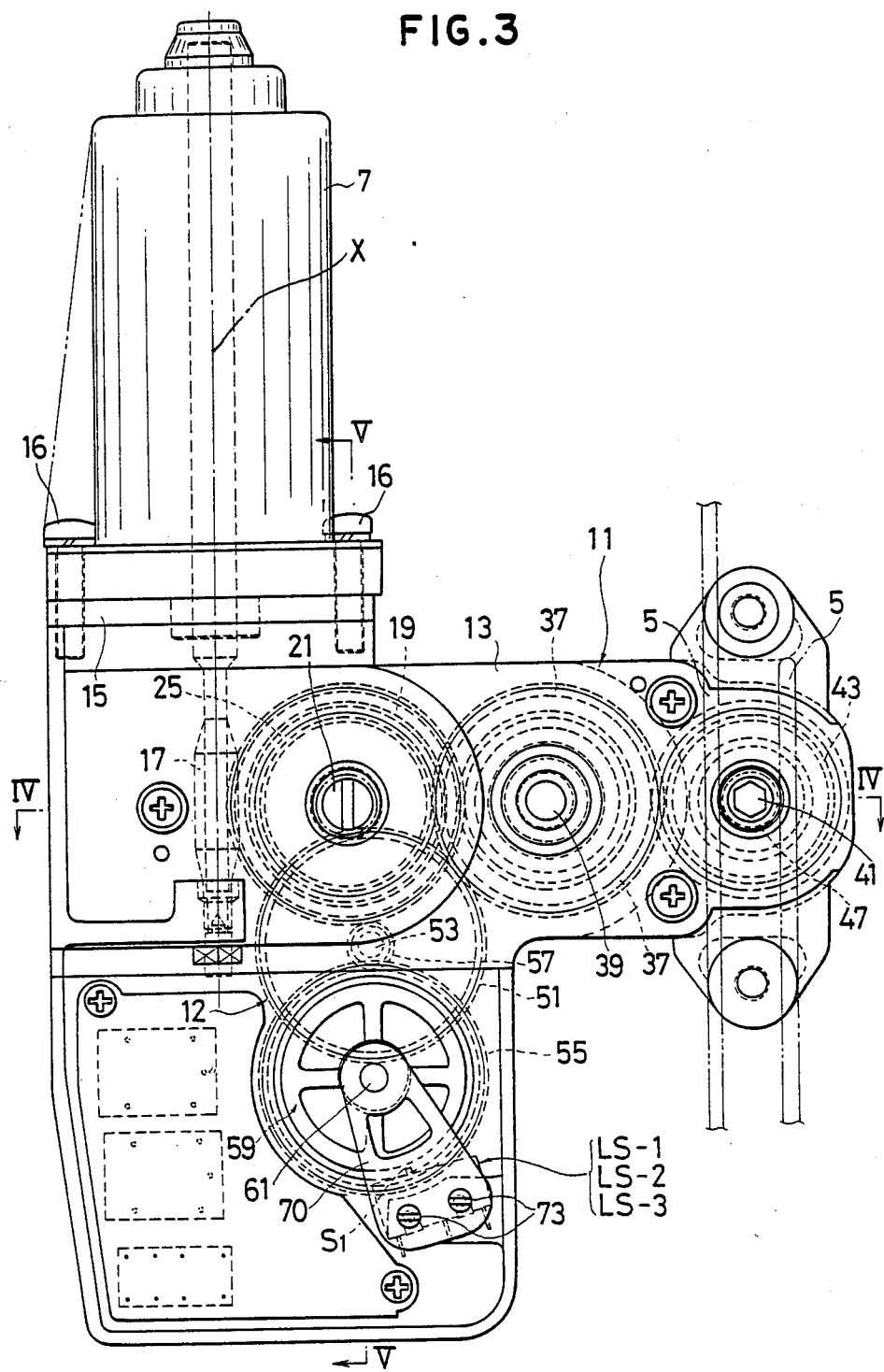
FIG. 3 is a plan view of the entire drive apparatus of FIG. 2.

The motor 7 can be rotated in the normal and reverse directions by an unillustrated hand switch and is arranged inside a roof 9 such that the axis X of the motor 7 is along the widthwise direction of a vehicle. In FIG. 3, the drive motor 7 is fixed by bolts 16 to a flange 15 of a casing body 13 in which first and second transmission gear systems 11 and 12 are disposed as described later.

A worm gear 17 is disposed on an output shaft of the drive motor 7 and is engaged with a main gear 19, which is a worm wheel, perpendicular to the axis X of the motor.

Figure 4:
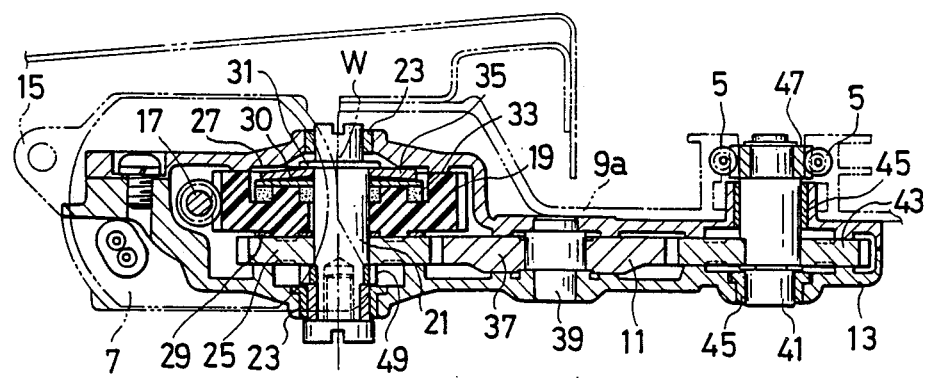
FIG. 4 is a sectional view taken along Line IV-IV of FIG. 3.
Figure 7:
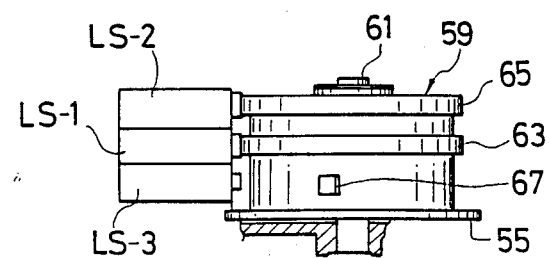
FIG. 7 is a view showing the relation between a rotary body and detecting switches.

The main gear 19 is movably fitted onto a main shaft 21 slidably supported at both ends thereof by the casing body 13 through a bearing member 23 in the direction of the axis W of the main shaft 21 as shown in FIG. 4. The both ends of the main shaft 21 are projected outward.

A drive gear 25 opposes the main gear 19 and is driven by the main gear 19, and is integrally fixed to the main shaft 21. The coupling force between the main gear 19 and the drive gear 25 is controlled by a frictional clutch 27, and a slip is generated between the main gear 19 and the drive gear 25 by the frictional clutch 27 when a load is applied to the drive gear 25 so that no load exceeding an allowable range is applied to the drive motor 7.

A washer 29 is disposed between the main gear 19 and the drive gear 25 and is fixed to the main gear 19. The main gear 19 and the drive gear 25 are engaged with each other through the washer 29 disposed therebetween. A ring-shaped clutch member 33 and a clutch spring 35 are disposed between the main gear 19 and a flange portion 31 of the main shaft 21 through a washer 30.

The drive gear 25 is engaged with a first gear 37 constituting the first transmission gear system 11 mentioned above. The first gear 37 is movably fitted onto a first gear shaft 39 supported at both ends thereof by the casing body 13, and is engaged with a second gear 43 fixed to a second gear shaft 41 so that the shape of a discharging tray 9a is not adversely affected by such engagement.

The second gear shaft 41 is rotatably supported at both ends thereof by the casing body 13 through a bearing member 45, and one end of the second gear shaft 41 is projected outward from the casing body 13 and is fixed to a third gear 47 engaged with gear portions of the drive wires 5, 5. When the third gear 47 is rotated in the normal or reverse direction, the drive wires 5, 5 are moved and it is thereby possible to raise the rear side of the lid 1 and slide the lid 1 in the forward and backward directions of the vehicle, performing a tilting control and a sliding control, respectively.

Figure 5:
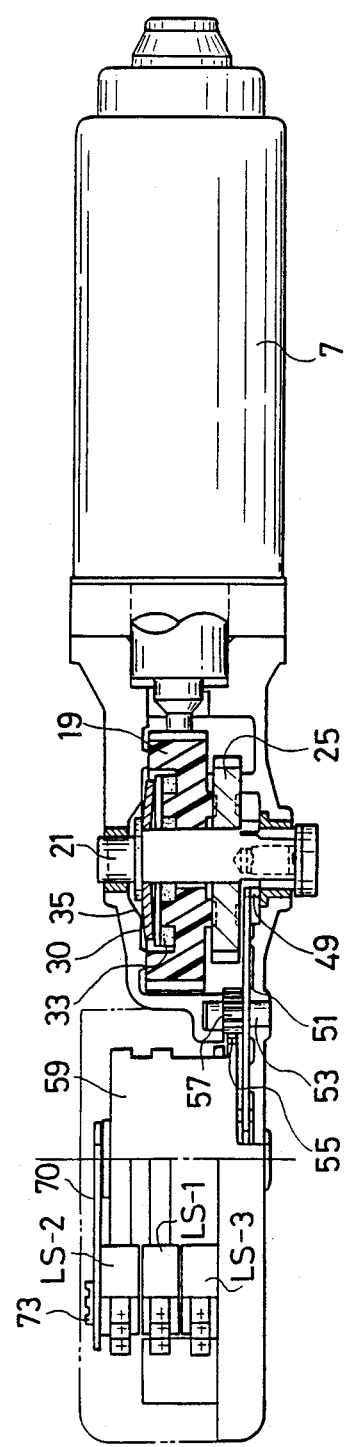
FIG. 5 is a sectional view taken along Line V-V of FIG. 3.
Figure 6:
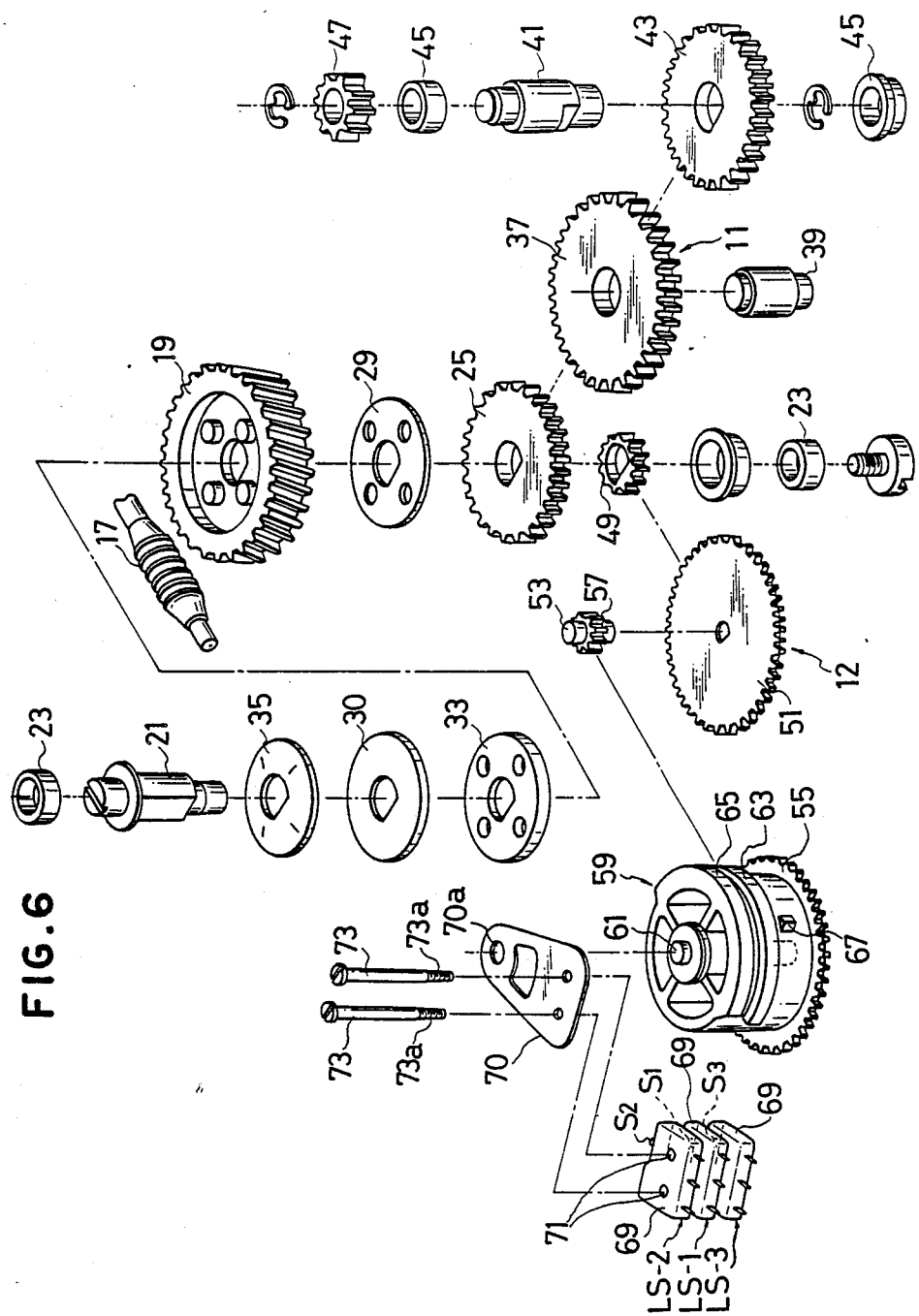
FIG. 6 is an exploded perspective view of first and second transmission gear systems.

In FIG. 5, a subgear 49 is integral with a lower portion of the drive gear 25 attached to the main shaft 21, and is engaged with a first gear 51 constituting the second transmission gear system 12. The first gear 51 is fixed to a first gear shaft 53 having gear portions 57 supported at both ends thereof by the casing body 13, and the gear portions 57 are engaged with a drive gear 55 of a rotary body 59. As shown in FIG. 6, the drive gear 55 of the rotary body 59 is attached to a rotary shaft 61 of the rotary body 59 supported at both ends thereof by the casing body 13.

First, second and third control surfaces 63, 65 and 67 are respectively formed around circumferential portions of the rotary body 59. First, second and third detecting switches LS-1, LS-2 and LS-3 respectively have switching terminals $S_1$, $S_2$ and $S_3$ capable of contacting the respective first, second and third control surfaces 63, 65 and 67, and are stacked with each other, forming three stages and constituting a switch body 69. Through holes 71 are disposed in the switch body 69, and receive bolts 73 through a bracket 70, and screw portions 73a of the bolts 73 are screwed into the casing body 13. An attaching hole 70a disposed in the bracket 70 is fitted onto the rotary shaft 61 of the rotary body 59. Thus, the detecting switches LS-1, LS-2 and LS-3 are shaped such that they are simultaneously positioned with respect to the control surfaces 63, 65 and 67 of the rotary body 59, respectively.

Figure 8:
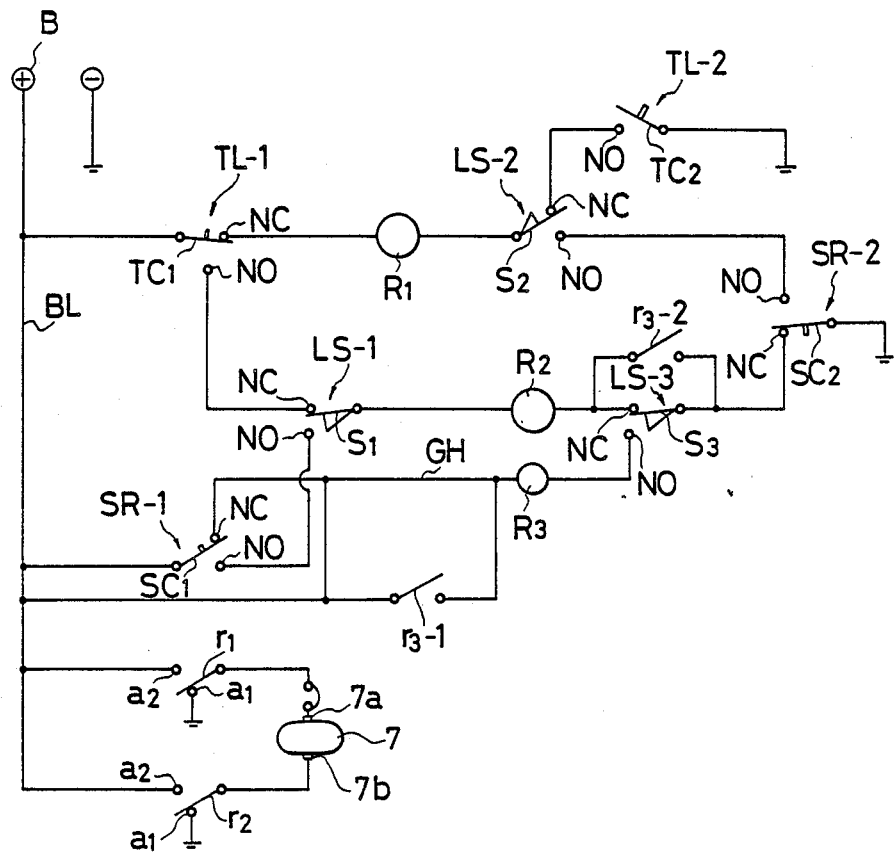
FIG. 8 is a diagram showing a control circuit of a drive motor in the drive apparatus in the present invention.
Figure 14A:
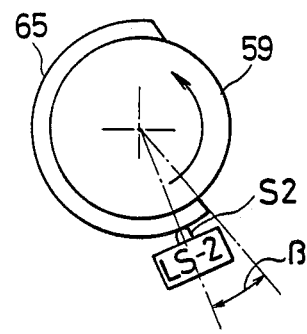
FIGS. 14A to 14C are view showing the movements of the respective control surfaces of the rotary body.
Figure 14B:
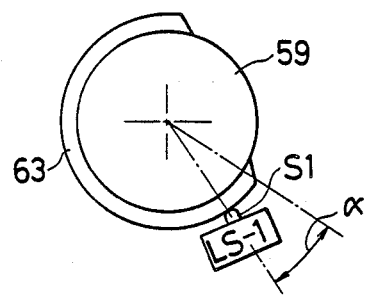
Figure 14C:
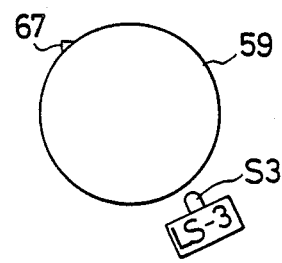

As shown in FIG. 8, the first detecting switch LS-1 controlled by the first control surface 63 has a normally closed contact NC for controlling the sliding of the lid 1. When a switch terminal $S_1$ of the first detecting switch LS-1 contacts the first control surface 63, the first detecting switch LS-1 is turned on and the normally closed contact NC is open. This opening state of the contact NC is secured within the region of the first control surface 63 by a margin region $\alpha$ for holding the opening state even after the normally closed contact NC has been completely open, as shown in FIG. 14B.

The second detecting switch LS-2 controlled by the second control surface 65 has a normally closed contact NC for controlling the tilting of the lid 1. When a switching terminal $S_2$ of the second detecting switch LS-2 contacts the second control surface 65, the second detecting switch is turned on and the normally closed contact NC is open. This opening state of the contact NC is secured within the region of the control surface 65 by a margin region $\beta$ for holding the opening state even after the normally closed contact NC has been open, as shown in FIG. 14A.

The third detecting switch LS-3 controlled by the third control surface 67 has a normally closed contact NC, and is turned on when a switching terminal $S_3$ of the third detecting switch LS-3 contacts the third control surface 67. The third control surface 67 is projected from the circumferential surface of the rotary body 59 such that the contact NC is open by the third control surface 67 in an intermediate sliding position of the lid separated by 150 mm from a completely closed position in which the roof opening 3 is completely closed by the lid 1.

FIG. 8 shows a control circuit of the drive motor having the first, second and third detecting switches LS-1, LS-2 and LS-3.

In FIG. 8, a tilt-up switch TL-1 and a tilt-down switch TL-2 are manually operated, and a slide-closed switch SR-1 and a slide-open switch SR-2 are also manually operated. The tilt-up switch TL-1 has an open contact NO in which a switching terminal $TC_1$ is open in the neutral position, and has a normally closed contact NC. The switching terminal $TC_1$ is electrically connected to a power source circuit BL connected to a battery source B. The normally closed contact NC is connected in series to the switching terminal $S_2$ of the second detecting switch LS-2 through a first relay coil $R_1$ constituting a relay circuit. The open contact NO is connected to the normally closed contact NC of the first detecting switch LS-1 in which the switching terminal $S_1$ is closed.

A normally closed contact NC of the second detecting switch LS-2 in which a switching terminal $S_2$ is closed is connected to an open contact NO of the tilt-down switch TL-2 in which a switching terminal $TC_2$ is in the open state. The switching terminal $TC_2$ is connected to the ground. The switching terminal $S_2$ of the second detecting switch LS-2 is connected to an open contact NO of the switch SR-2 in which a sliding open switching terminal $SC_2$ is in the open state.

A relay terminal $r_1$ connected to a first motor terminal 7a of the drive motor 7 is actuated in association with a first relay coil $R_1$. Namely, when the first relay coil $R_1$ is energized, the relay terminal $r_1$ is switched from an earth contact $a_1$ to a closed contact $a_2$.

The slide-closed switch SR-1 has an open contact NO in the open state of a switching terminal $SC_1$ in the neutral position of the switch, and has a normally closed contact NC. The switching terminal $SC_1$ is connected to the power source circuit BL and the normally closed contact NC of the slide-closed switch SR-1 is connected to a self-holding circuit GH as described later. The open contact NO of the slide-closed switch SR-1 is connected to the open contact NO of the first detecting switch LS-1.

The switching terminal $S_1$ of the first detecting switch LS-1 is connected in series through a second relay coil $R_2$ constituting the relay circuit to a normally closed contact NC of the third detecting switch LS-3 in which a switching terminal $S_3$ is open. A switching terminal $S_3$ of the third detecting switch LS-3 is connected to a normally closed contact NC of the slide-open switch SR-2 in which a switching terminal $SC_2$ is closed. The open switch terminal $SC_2$ is connected to the ground.

A relay terminal $r_2$ connected to a second motor terminal 7b of the drive motor 7 is actuated in association with a second relay coil $R_2$. Namely, when the second relay coil $R_2$ is energized, the relay terminal $r_2$ is switched from an earth contact $a_1$ to an open contact $a_2$. In addition, when the respective relay terminals $r_1$ and $r_2$ are open, the chassis of the vehicle is grounded and braking force is applied to the drive motor 7, stopping the operation of the motor 7.

A third relay coil $R_3$ of the self-holding circuit GH connected to the normally closed contact NC of the slide-closed switch SR-1 is connected in series to the open contact NO of the third detecting switch LS-3. Accordingly, when the third relay coil $R_3$ is energized, a relay terminal $r_3$-1 connected to the power source circuit BL, and a relay terminal $r_3$-2 connected in parallel to the switching circuit of the third detecting switch LS-3 are simultaneously closed. Even when the switching terminal $SC_1$ of the slide-closed switch SR-1 is switched to the open contact NO, the energized state of the relay coil $R_3$ is held through the relay terminals $r_3$-1 and $r_3$-2 and the third detecting switch LS-3 is in the operating state.

When the switching terminal $SC_2$ of the slide-open switch SR-2 is switched to the open terminal NO, the electric current flowing through the third relay coil $R_3$ is interrupted and the self-holding is released.

The operation of the drive apparatus mentioned above will now be described.

Figure 9:
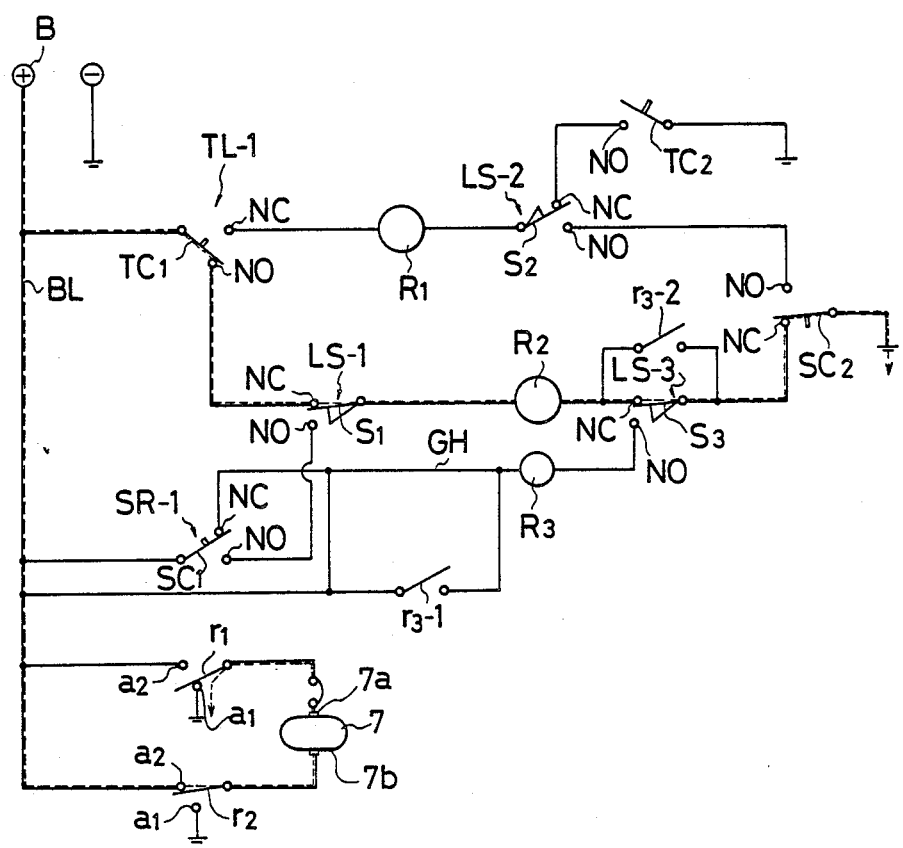
FIG. 9 is a view showing the control circuit when a lid is tilted up.
Figure 10A:
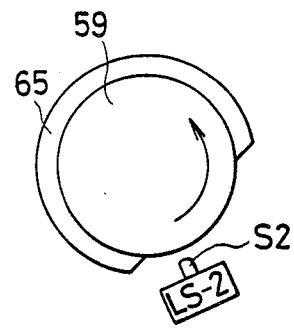
FIGS. 10A to 10C are views showing the movements of respective control surfaces of the rotary body.
Figure 10B:
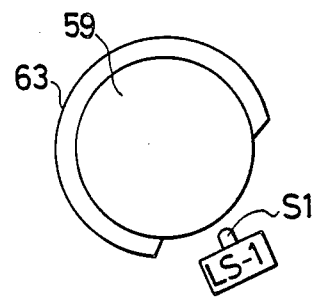
Figure 10C:
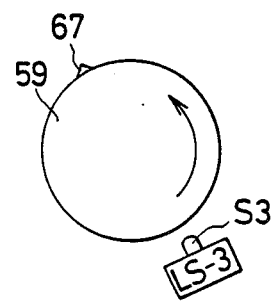

When the lid 1 in the completely closed state is tilted up, as shown in FIG. 9, the tilt-up switch TL-1 is switched from the contact NC to the open contact NO. Thus, the second relay coil $R_2$ is energized, and an electric current flows through the drive motor 7 from the second motor terminal 7b to the first motor terminal 7a, thereby rotating the drive motor 7 in the reverse direction. Simultaneously, the normally closed contact NC in the switching terminal $S_1$ of the first detecting switch LS-1 becomes in the open state by the rotation of the first control surface 63, and the second relay coil $R_2$ is deenergized. Accordingly, the relay contact $r_2$ returns to the open contact $a_2$, and the operation of the drive motor 7 is stopped. As a result, the tilt-up state of the lid 1 can be obtained.

Figure 11:
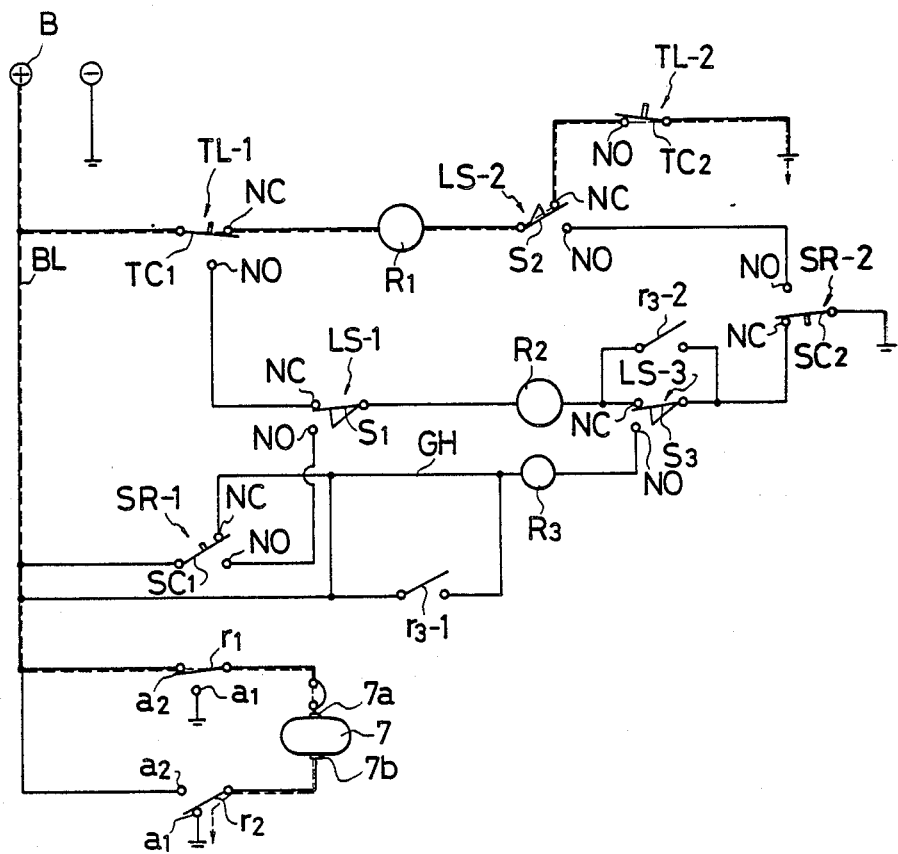
FIG. 11 is a diagram showing the control circuit when the lid is tilted down and completely closed from the tilt-up position thereof.
Figure 12A:
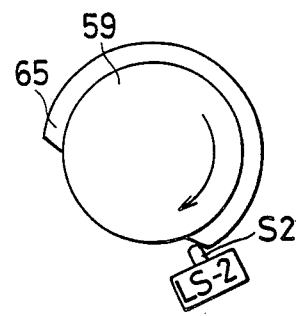
FIGS. 12A to 12C are views showing the movements of the respective control surfaces of the rotary body.
Figure 12B:
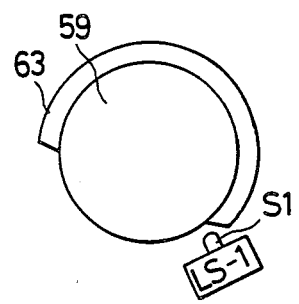
Figure 12C:
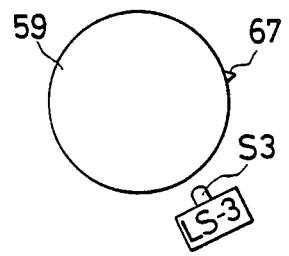

Next, when the lid 1 in the tilt-up state is tilted down and completely closed, as shown in FIG. 11, the tilt-down switch TL-1 is switched from the open contact NO to the contact NC so that the first relay coil $R_1$ is energized so that an electric current flows through the drive motor 7 from the first motor terminal 7a to the second motor terminal 7b, thereby rotating the motor 7 in the normal direction to tilt the lid 1 down. Simultaneously, the switching terminal $S_2$ of the second detecting switch LS-2 is switched by the rotation of the second control surface 65 from the contact NC to the open contact NO. Thus, the first relay coil $R_1$ is deenergized and the operation of the drive motor 7 is stopped. As a result, a completely closed state of the lid 1 is obtained and the roof opening 3 is completely closed by the lid. Thus, it is possible to perform the tilt-control of the lid 1 by the operations of the respective switches TL-1 and TL-2.

Figure 13:
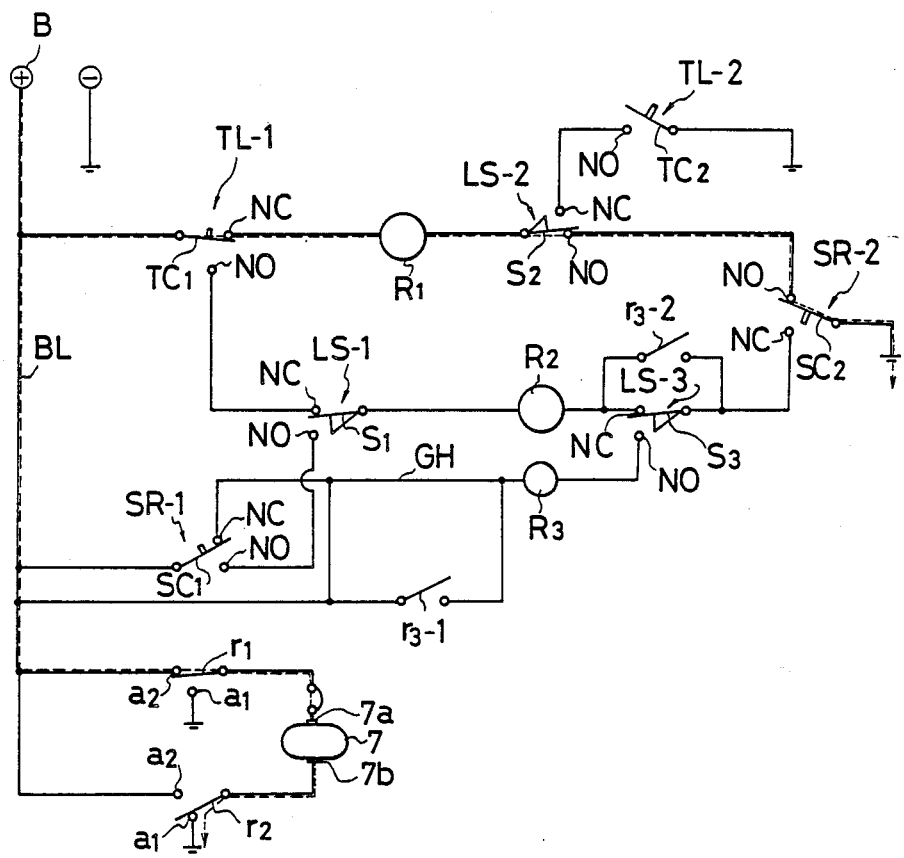
FIG. 13 is a diagram showing the control circuit in a completely opening sliding state.

Next, when the lid 1 is slided and completely opened from the completely closed state, as shown in FIG. 13, the slide-open switch SR-2 is switched from the contact NC to the open contact NO. At this time, the switching terminal $S_2$ of the second detecting switch LS-2 has been switched to the open contact NO by the second control surface 65 so that the first relay coil $R_1$ is in the energized state, and an electric current flows through the drive motor 7 from the first motor terminal 7a to the second motor terminal 7b, thereby rotating the motor 7 in the normal direction to slide the lid 1 backward. When the second control surface 65 is rotated over the margin region $\beta$, the switching terminal $S_2$ of the second detecting switch LS-2 returns to the normally closed contact NC. Accordingly, the first relay coil $R_1$ is deenergized and the operation of the drive motor 7 is stopped. As a result, the lid 1 is housed within the roof 9 and the completely open state of the lid 1 is obtained.

Figure 15:
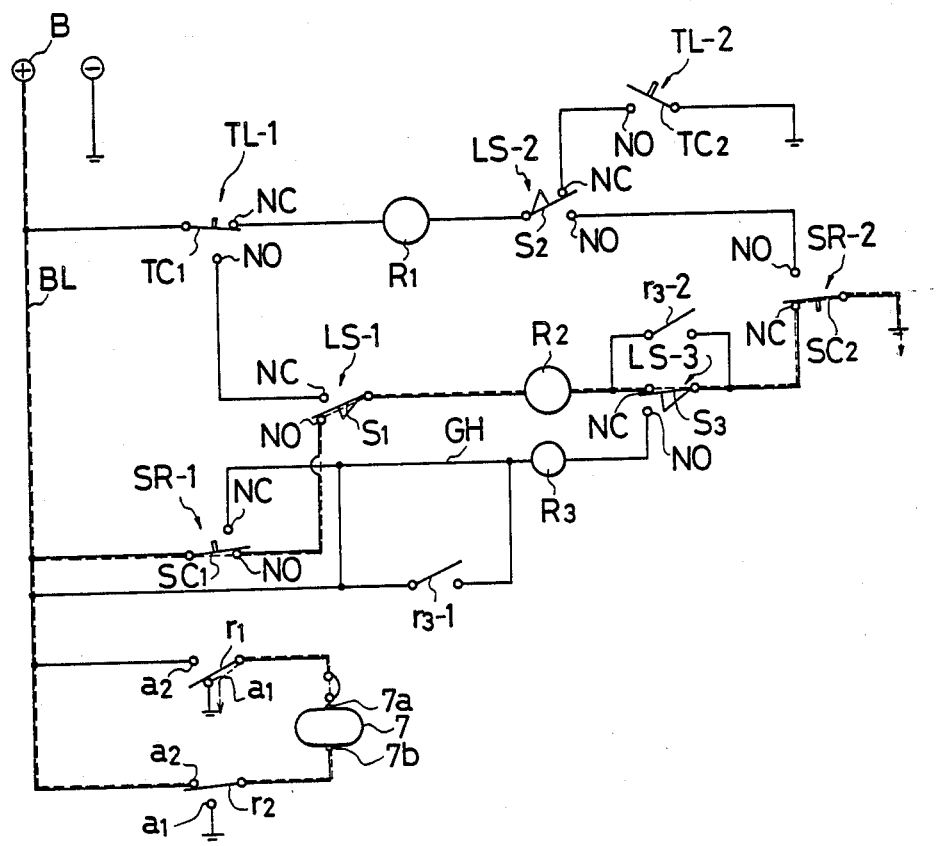
FIG. 15 is a diagram showing a stopping state in which the lid is stopped in an intermediate sliding position thereof from the completely opening position with 150 mm left between the intermediate sliding position and the completely closed position.
Figure 16A:
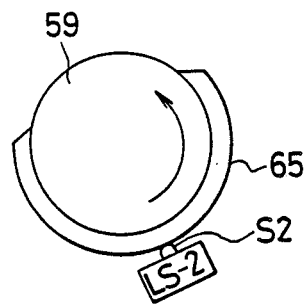
FIGS. 16A to 16C are views showing the movements of the respective control surfaces of the rotary body.
Figure 16B:
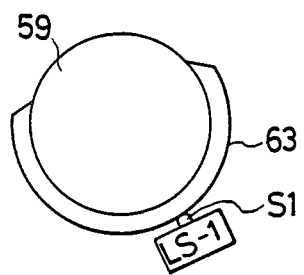
Figure 16C:
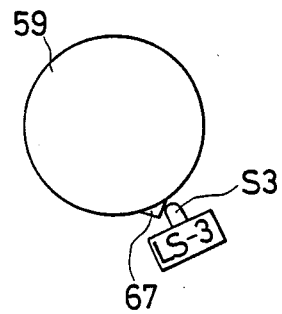

When the lid 1 in the completely open state is next closed, as shown in FIG. 15, the slide-closed switch SR-1 is switched from the contact NC to the open contact NO. Thus, the second relay coil $R_2$ is energized and an electric current flows through the drive motor 7 from the second motor terminal 7b to the first motor terminal 7a, thereby rotating the motor 7 in the reverse direction to slide the lid 1 forward. When the lid 1 approaches the completely closed position, the third control surface 67 controls the switching of the switching terminal $S_3$ of the third detecting switch LS-3, thereby opening the normally closed contact NC thereof. Thus, the second relay coil $R_2$ is deenergized and the operation of the drive motor 7 is stopped. As a result, the lid 1 is once stopped at an intermediate position separated by about 150 mm from the completely closed position. At this time, the stopping state of the drive motor 7 is held even when the slide-closed switch SR-1 is continued to be operated in this state.

Figure 17:
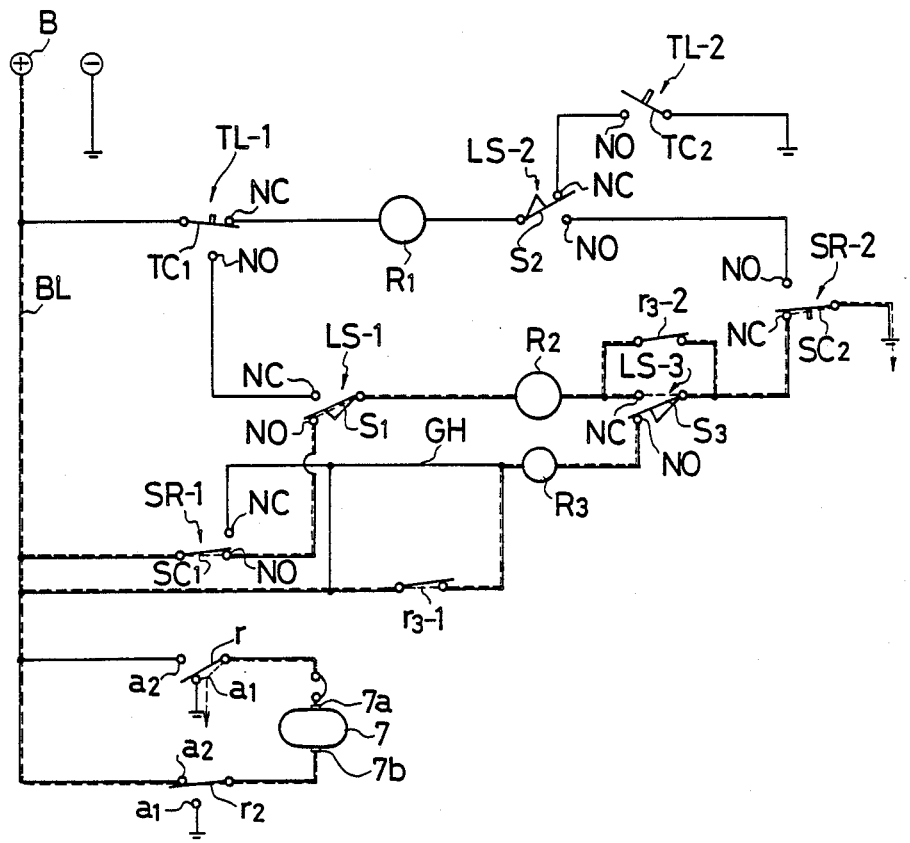
FIG. 17 is a diagram showing the control circuit in a completely closed state of the lid in which the lid is in the completely closed position from the intermediate sliding position.
Figure 18A:
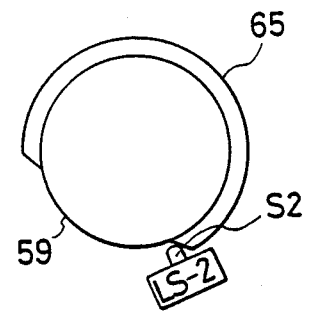
FIGS. 18 are views showing the movements of the respective control surfaces of the rotary body.
Figure 18B:
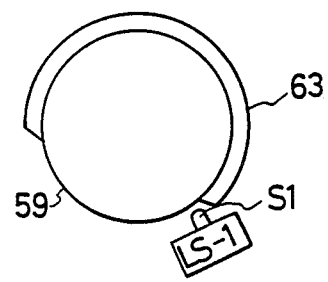
Figure 18C:
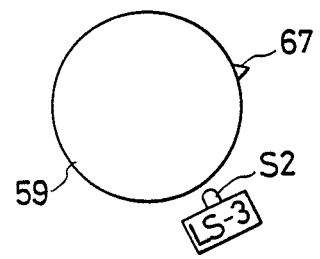

Once when the slide-closed switch SR-1 is manually operated to switch the switching terminal $SC_1$ from the open contact NO to the closed contact NC, an electric current flows through the self-holding circuit GH and the third relay coil $R_3$ is energized. Thus, the two relay terminals $r_3$-1 and $r_3$-2 are closed, and the self-holding circuit GH is in the operating state. Accordingly, as shown in FIG. 17, when the slide-closed switch SR-1 is subsequently switched from the terminal NC to the open contact NO, the second relay coil $R_2$ is energized through the relay contact $r_3$-2 and an electric current flows through the drive motor 7 from the second motor terminal 7b to the first motor terminal 7a, thereby rotating the motor 7 in the reverse direction. When the lid 1 is then slid to the completely closed position, the switching terminal $S_1$ of the first detecting switch LS-1 pressed by the first control surface 63 returns to the normally closed contact NC. Further, the switching terminal $S_3$ of the third detecting switch LS-3 returns to the normally closed contact NC. Accordingly, the self-holding is released and the operation of the drive motor 7 is stopped. As a result, the lid 1 is stopped in the completely closed position, and the roof opening 3 is completely closed by the lid 1.

Thus, the lid 1 completely closes and opens the roof opening 3 by operating the slide-closed switch SR-1 and the slide-open switch SR-2, respectively. When the lid 1 is actuated, there is no displacement of the detecting switches LS-1, LS-2 and LS-3 with respect to the respective control surfaces 63, 65 and 67 of the rotary body 59 since the detecting switches are integrally stacked with each other so that the positions of the control surfaces of the rotary body are reliably detected. Further, the rotary body 59 and the respective detecting switches LS-1, LS-2 and LS-3 are not greatly projected upward so that the thickness of the entire apparatus can be reduced.

As mentioned above, according to a drive apparatus in the present invention, a rotary body for controlling detecting switches are rotated by a second transmission gear system branched from a drive gear so that there are no adverse affects on a region for a discharging tray and the thickness of the entire apparatus can be reduced, and the apparatus can be attached to a vehicle without increasing a housing space for the apparatus. Further, since the respective switches are stacked with each other and are attached to the casing body, the detecting accuracy and operability of the switches are improved since the positioning of the switches with respect to the casing body is performed at only one time.

Figure 19:
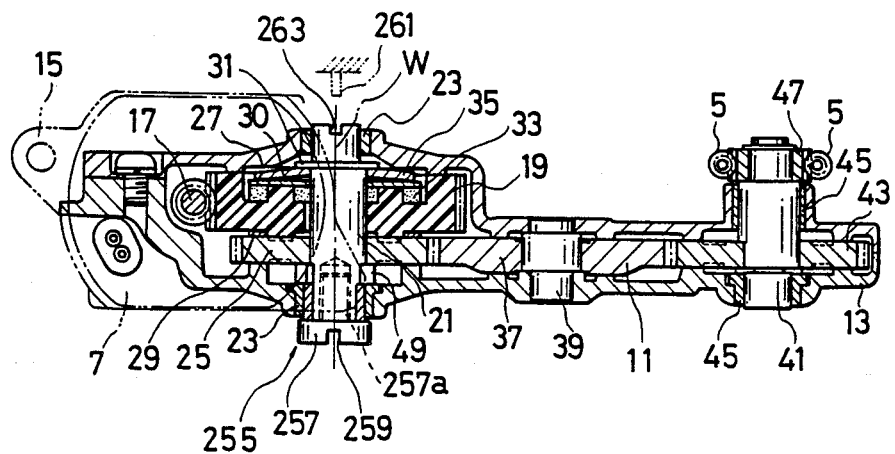
FIG. 19 is a sectional view of the drive apparatus similar to the one of FIG. 4 in which a main shaft can be fixed by a jig.

FIG. 19 shows a drive apparatus similar to the one in FIG. 4. A screw portion 257a of a bolt 257 constituting an adjusting portion 255 is screwed into an end of a main shaft 21 on the side of the drive gear 25. A head portion of the main shaft 21 is projected and exposed outward, and is provided with a minus groove 259. An engaging portion 263 engagable with a fixing jig 261 is disposed at the other end of the main shaft 21 in the axial direction thereof.

Figure 20:
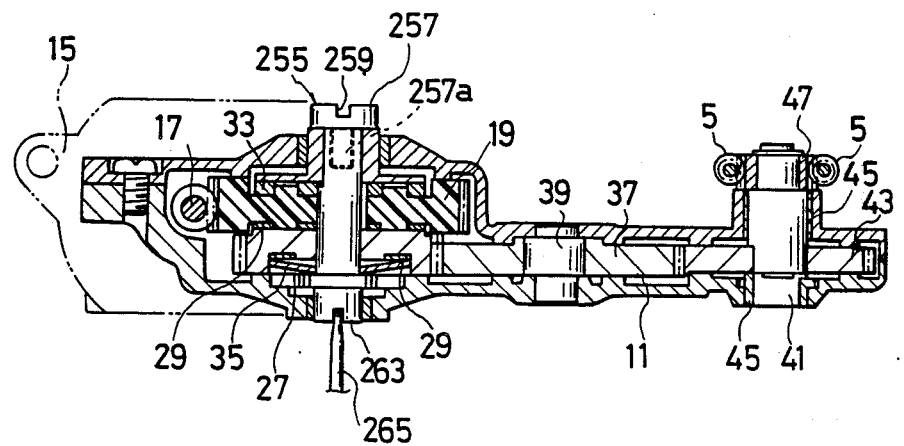
FIG. 20 is a sectional view of the drive apparatus similar to FIG. 19 showing a modified embodiment of the attaching position of an adjusting portion.
Figure 21:
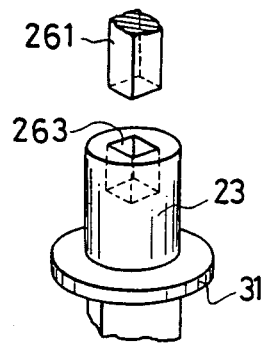
FIG. 21 is a perspective view of the main shaft showing a modified embodiment of an engaging portion.

As shown in FIG. 20, a bolt 257 constituting an adjusting portion 255 may have a screw portion 257a screwed into one end of the main shaft 21 on the side of a main gear 19, and an engaging portion 263 may be disposed at the other end of the main shaft 21 on the side of the drive gear 25. In this case, the amount of a portion of the apparatus projected on the inner side, i.e., downward from the casing body 13 can be minimized, and the lid 1 can be manually opened and closed by inserting a tool 265 into the engaging portion 263 and rotating the main shaft 21 at an emergency time when the drive motor 7 is unoperated. Further, the bolt 257 is not untightened when the engaging portion 263 is operated. In the above embodiment, the engaging portion 263 is in the shape of a minus groove, but may be in the shape of a rectangular groove as shown in FIG. 21 in which the fixing jig 261 has a rectangular shape.

In the drive apparatus mentioned above, after the apparatus has been assembled, as in FIG. 20, a fixing jig is engaged with the main shaft 21 with the engaging portion 263 located downward. The bolt 257 is located on the upper side of the main shaft 21 and can be rotated by a tool, etc. At this time, the bolt 257 is easily rotated since the main shaft 21 is in the fixed state.

In FIG. 19, by screwing the bolt 257 into the main shaft 21, the main shaft 21 is moved on the downward direction and the spring pressure of the clutch spring 35 applied onto the main gear 19 is increased. As a result, the main gear 19 and the drive gear 25 strongly contact each other through the washer 29, obtaining a predetermined coupling force.

Thus, the rotary power of the main gear 19 is transmitted from the drive gear 25 through the transmission system 11 to the gear 47, and the lid 1 is opened and closed by moving the drive wires 5, 5 engaged with the gear 47.

As mentioned above, according to a drive apparatus of a lid in the present invention, a main shaft is fixed by a fixing jig when the coupling force of a clutch member is adjusted, facilitating the operation of the adjusting portion and improving the operability thereof.

Further, it is unnecessary to perform the spline-processing between an intermediate gear and a gear shaft constituting a transmission mechanism and dispose a bearing member of the gear shaft, improving the assembly and processing of the apparatus and reducing the number of parts.

Figure 22A:
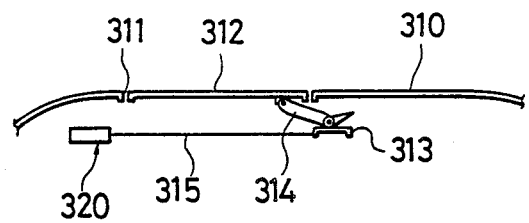
FIGS. 22A to 22C are longitudinally sectional views of a roof portion including the lid in various operating states thereof.
Figure 22B:
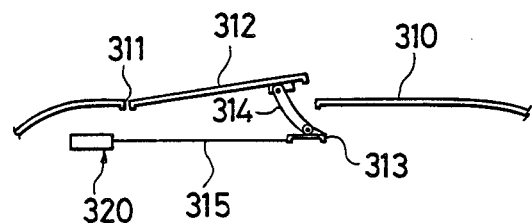
Figure 22C:
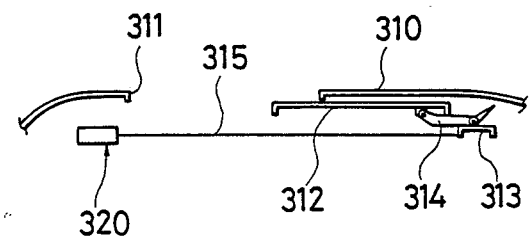

FIGS. 22A to 22C show a roof structure of the drive apparatus in the present invention. In these figures, a lid 312 for opening and closing an opening 311 disposed in the roof 310 of a vehicle is supported by a movable base 313 through a link 314. The movable base 313 is movably supported by an unillustrated rail thereon, and a geared cable 315 for moving the movable base 313 is disposed along the rail. A drive mechanism 320 for driving the geared cable 315 is disposed in the vicinity of the front end of the opening 311 corresponding to an end of the geared cable 315.

Figure 23:
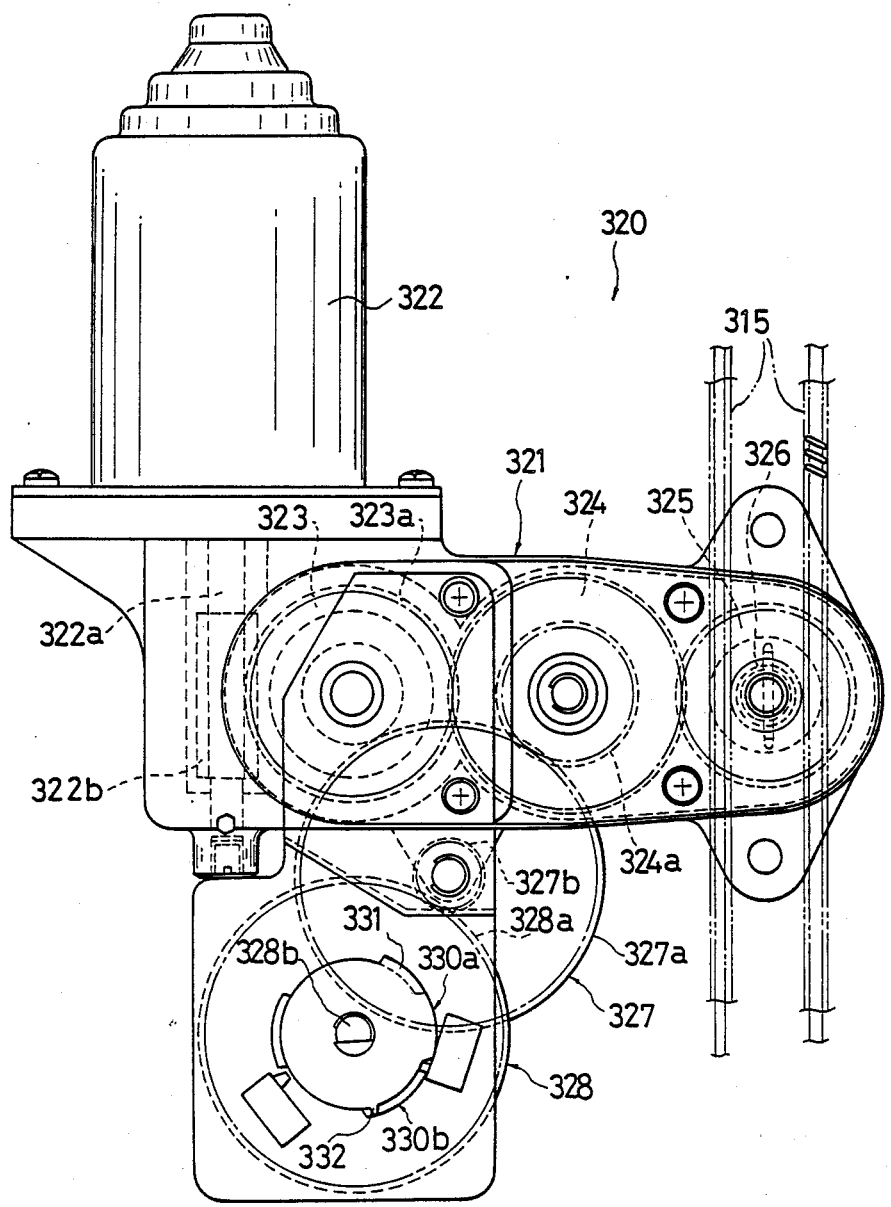
FIG. 23 is a plan view of a drive mechanism for driving the lid similar to FIG. 3.

As shown in FIG. 23, in the drive mechanism 320, various kinds of parts are attached to a housing 321 fixed to the roof 310. Namely, a worm wheel 323 is engaged with a worm gear 322b fixed to a drive shaft 322a of a motor 322 rotated in the normal and reverse directions. A gear section 323a integrally fixed to the worm wheel 323 is engaged with an intermediate gear 324 which is also engaged with an intermediate gear 325. A small gear section 326 integrally fixed to the intermediate gear 325 is engaged with the geared cable 315.

A small gear 324a is fixed to the intermediate gear 324 and is engaged with a large gear section 327a of a transmission gear 327. A rotary member 328 is adjacent the transmission gear 327 and has a gear section 328a engaged with the small gear section 327b of the transmission gear 327.

The geared cable 315 is longitudinally moved by the rotation of the motor 322, and the rotary member 328 is rotated in synchronization with the opening and closing of the lid 312 by the movement of the geared cable 315. The entire operating ranges of the lid 312 are located within a rotational angle of the rotary member 328 less than one rotation thereof.

Figure 24:
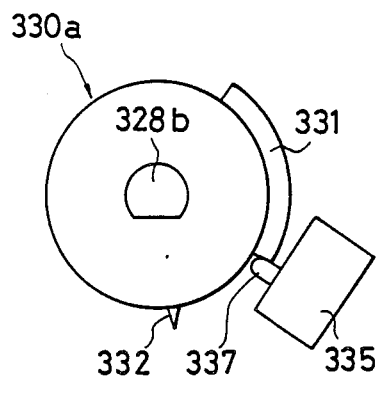
FIGS. 24 and 25 are plan views of cam plates in the drive mechanism.
Figure 25:
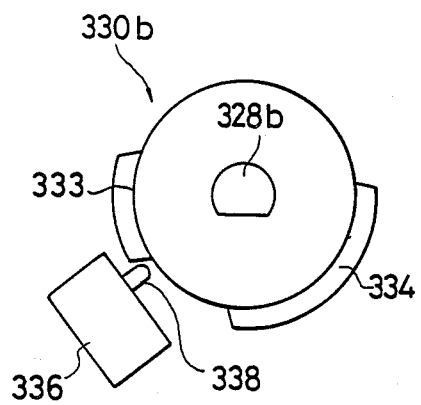

As shown in FIGS. 23 to 25, two cam plates 330a and 330b are fixed to the drive shaft 328b of the rotary member 328. The cam plate 330a has, in the outer circumference thereof, a projected portion 331 disposed in accordance with a region from the tilting position of the lid 312 to the completely closed position thereof, and a projected portion 332 corresponding to an intermediate sliding position of the lid. The cam plate 330b has, in the outer circumference thereof, a projected portion 333 disposed in accordance with a region from the completely closed sliding position of the lid 312 to the intermediate sliding position thereof, and a projected portion 334 corresponding to the completely opening position of the lid 312 and the tilting position thereof.

Position detecting switches 335 and 336 are disposed on the housing 321 and are respectively adjacent the cam plates 330a and 330b. The position detecting switches 335 and 336 respectively have projections 337 and 338 in slide contact with the outer circumferences of the cam plates 330a and 330b.

Figure 26:
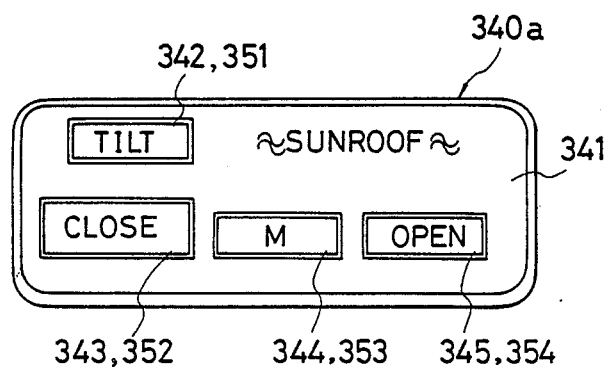
FIG. 26 is a front view of a display panel.

FIG. 26 shows a display panel 340a having, on the panel surface 341 thereof, a tilting position display lamp 342, a lamp 343 for displaying the completely closed sliding position of the lid, a lamp 344 for displaying the intermediate sliding position of the lid, and a lamp 345 for displaying the completely opening sliding position of the lid.

Figure 27:
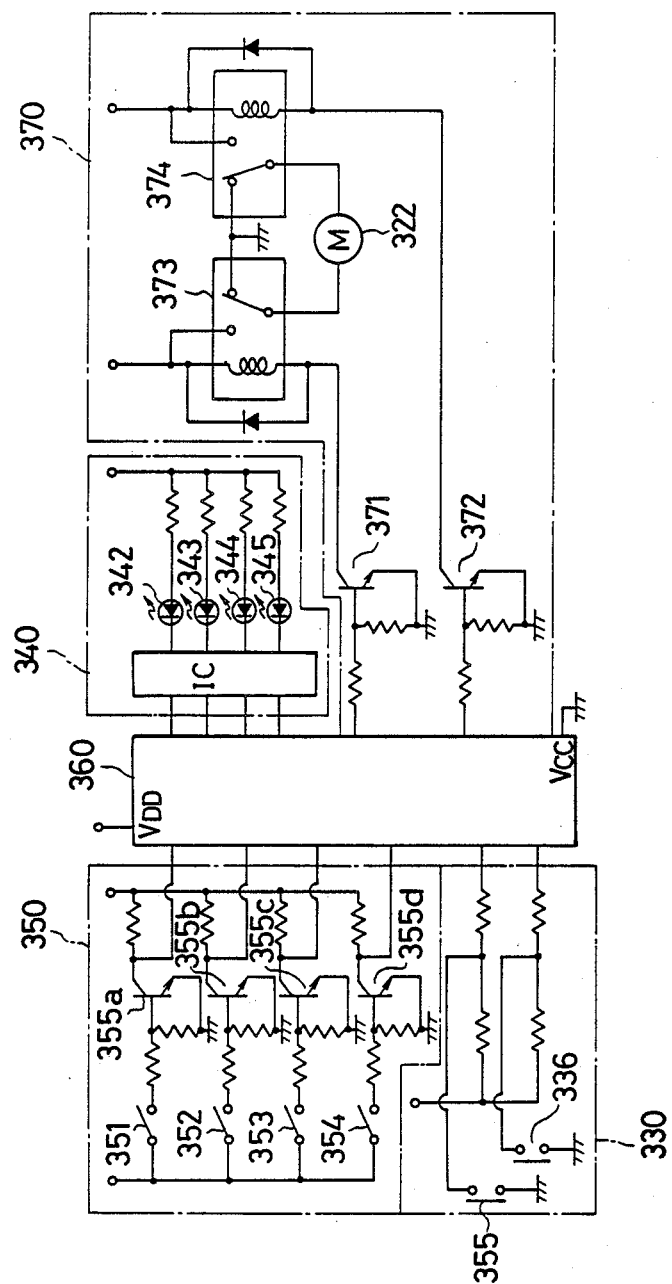
FIG. 27 is a view showing a control circuit in the drive apparatus.

FIG. 27 shows a control circuit of the drive apparatus comprising a position detecting device 330, a display device 340, an operating device 350, a judging device 360, and a drive control device 370.

The position detecting device 330 is constituted by the position detecting switches 335 and 336 disposed in the cam plates 330a and 330b.

The display device 340 comprises the tilting position display lamp 342 disposed in the display panel 340a, the completely closed sliding position display lamp 343, the intermediate sliding position display lamp 344, and the completely opening sliding position display lamp 345. Theses display lamps are driven by an IC.

The operating device 350 comprises a tilting operating switch 351, an operating switch 352 for the completely closed sliding position, an operating switch 353 for the intermediate sliding position, an operating switch 354 for the completely opening sliding position, and switching transistors 355a to 355d connected to these switches. These switches are disposed in accordance with the display lamps 342, 343, 344 and 345 of the display device 340.

The judging device 360 is constituted by a microprocessor.

The drive control device 370 has a drive section comprising switching transistors 371 and 372, and drive relays 373 and 374 for rotating the motor 322 in the normal and reverse directions in association with the respective switching transistors 371 and 372. The microprocessor of the judging device 360 constitutes a judging section of the drive control device 370.

Figure 28:
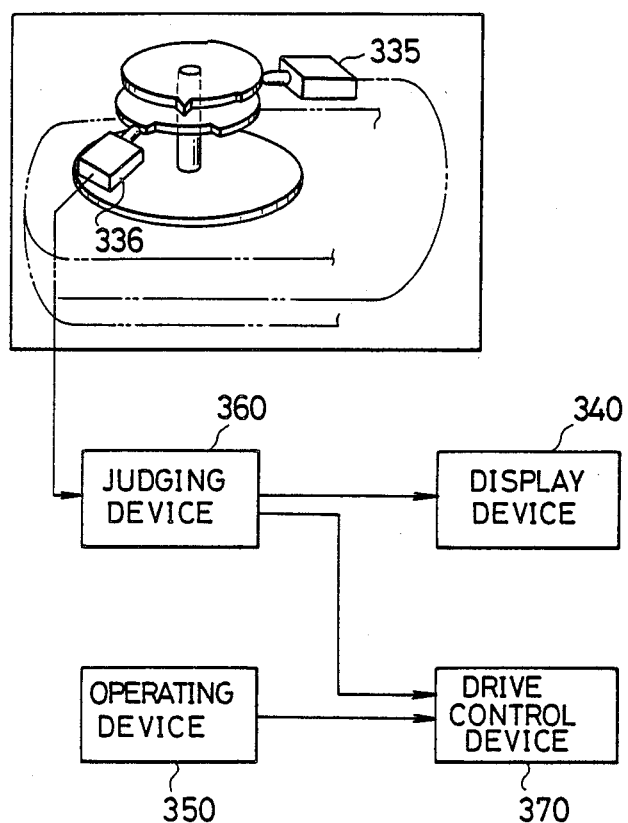
FIG. 28 is a schematic view showing the main construction of the drive apparatus according to the embodiment in FIGS. 22A to 27.

FIG. 28 shows the relation between the judging device 360, the display device 340, the operating device 350 and the drive control device 370.

The operation of the control device mentioned above will now be described.

When the lid 312 is opened and closed, the cam plates 330a and 330b are rotated in synchronization with the opening and closing of the lid 312. When the projections 337 and 338 of the position detecting switches 335 and 336 are pushed and actuated by the projected portions 331, 332, 333 and 334, the position detecting switches 335 and 336 output high voltage signals (1). The position detecting switches 335 and 336 output low voltage signals (0) when the projections 337 and 338 are not pushed by the projected portions 331, 332, 333 and 334.

When the judging device 360 inputs one-bit signals from the position detecting switches 335 and 336 constituting the position detecting device 330, the judging device combines the respective one-bit signals with each other and judges them as a two-bit signal. Thus, as shown in FIG. 29, the judging device 360 judges whether the lid 312 is located in the completely opening tilting position corresponding to (1,1), the completely closed sliding position corresponding to (0,0), the intermediate sliding position corresponding to (1,0), and the completely opening sliding position corresponding to (0,1).

The display device 340 turns on one of the tilting position display lamp 342, the completely closed sliding position display lamp 343, the intermediate sliding position display lamp 344, and the completely opening sliding position display lamp 345 in accordance with the position of the lid 312 based on the judged results by the judging device 360. Thus, an operator can confirm the position of the lid 312.

The drive control device 370 rotates the motor 322 in the normal or reverse direction when an electric current flows through one of the switching transistors 371 and 372, by the operation of the microprocessor 360 in accordance with flow charts shown in FIGS. 30A to 30E.

Figure 30A:
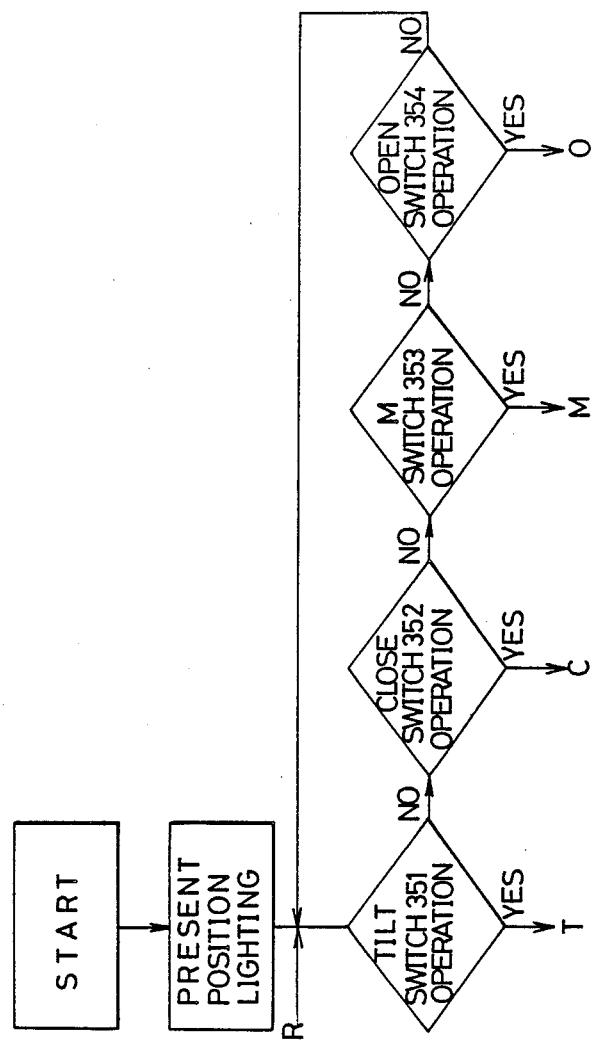
FIGS. 30A to 30E are flow charts showing the operation of the control device.

Namely, as shown in FIG. 30A, the display lamp 340 turns on one of the display lamps 342, 343, 344 and 345 on the display panel 340a corresponding to the present position of the lid, and the control device is in a state in which an input signal can be received. An operator confirms the present position of the lid 312, and operates one of the switches 351, 352, 353 and 354 of the operating device 350.

Figure 30B:
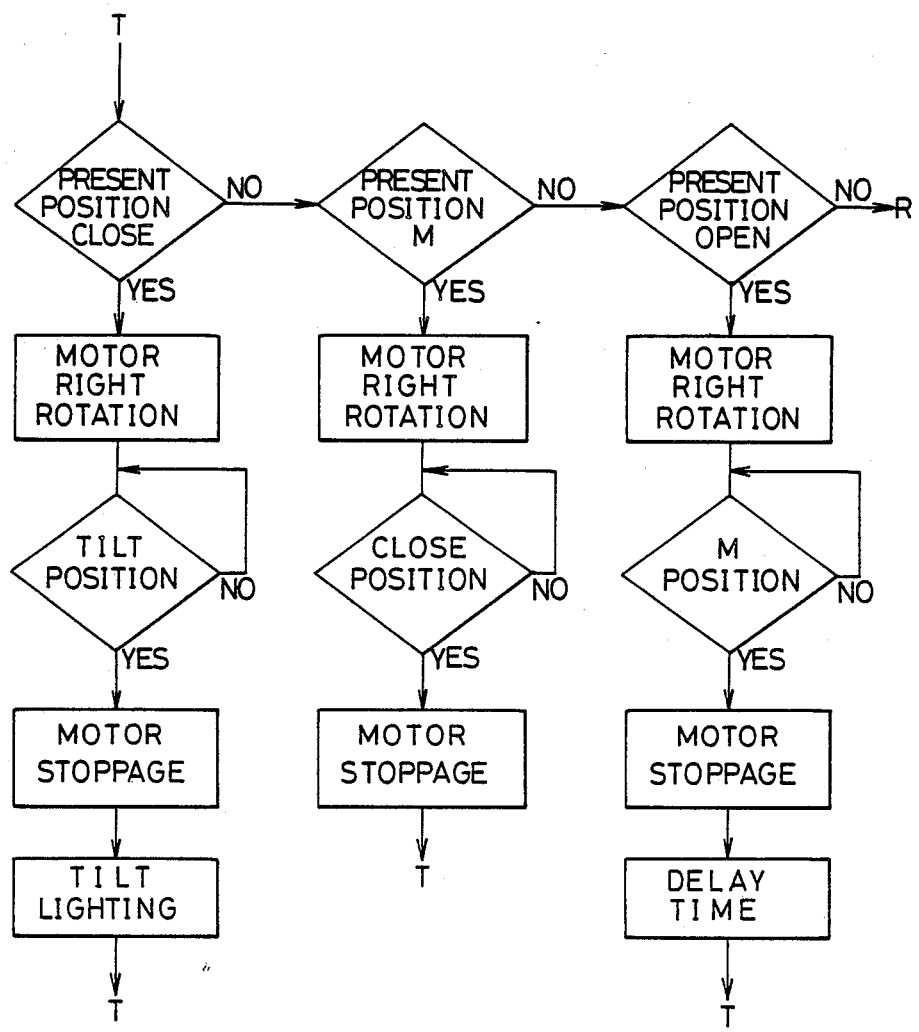

When the tilting operating switch 351 is operated, the control device proceeds to a route T of FIG. 30B from the route T of FIG. 30A, the judging device 360 judges the present position of the lid 312 according to the route T. The drive control device 370 tilts and opens the lid 312 when the present position of the lid is the completely closed sliding position. When the present position of the lid is the intermediate sliding position, the drive control device 370 completely closes the lid 312 once and returns to the route T, and tilts and opens the lid 312.

When the present position of the lid 312 is the intermediate sliding position, the lid 312 is slided and is completely closed once and the control device returns to the route T, and tilts and opens the lid 312 as in the above process. When the control device returns to the route T and the lid 312 is tilted and opened, the tilting display lamp 342 is turned on, and the control device returns to the route R of FIG. 30A in which an input signal can be received.

Figure 30C:
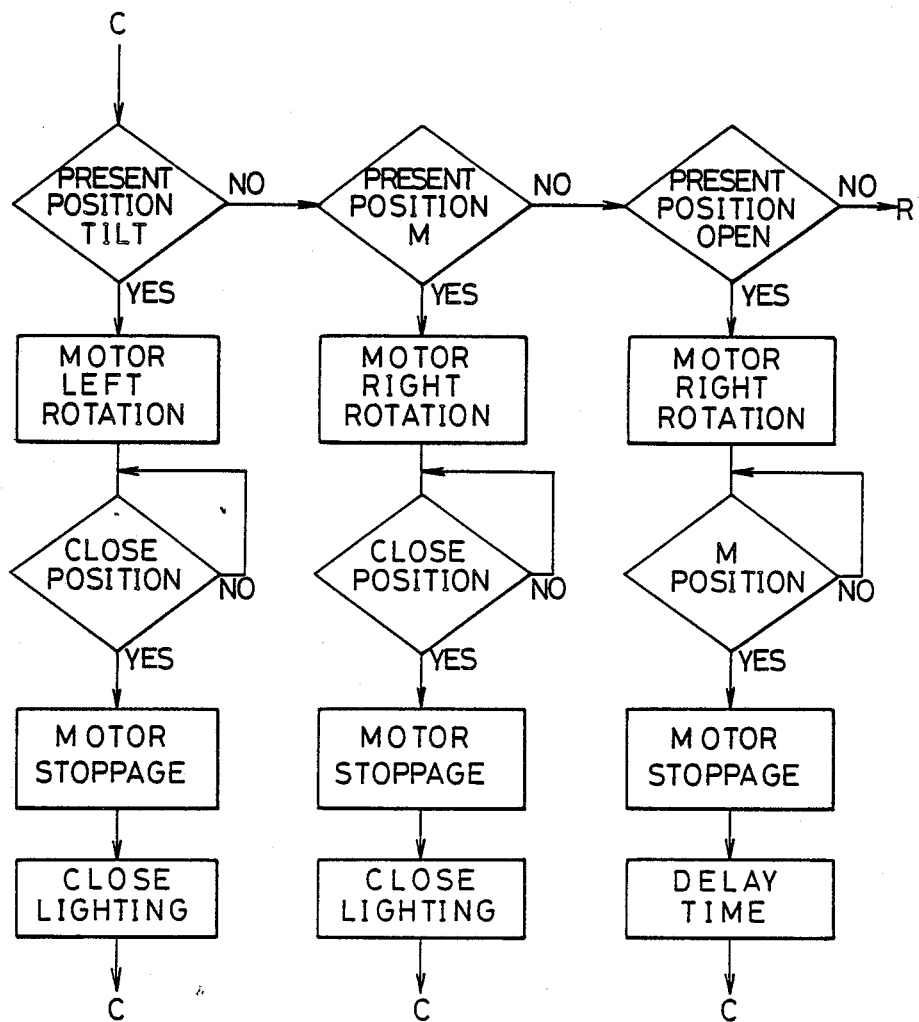

When the completely closed sliding operating switch 352 is operated, the control device proceeds to a route C in FIG. 30C. When the present position of the lid 312 is the sliding opening position, the lid 312 is closed and the control device returns to the route C. When the present position of the lid 312 is the intermediate sliding position, the lid 312 is slided and completely closed and the control device returns to the route C.

When the present position of the lid 312 is the completely opening sliding position, the lid 312 is completely closed through the intermediate sliding position, and the control device returns to the route C. When the control device returns to the route C and the lid 312 is completely closed, the completely closed sliding position display lamp 343 is turned on and the control device returns to the route R of FIG. 30A in which an input signal can be received.

Figure 30D:
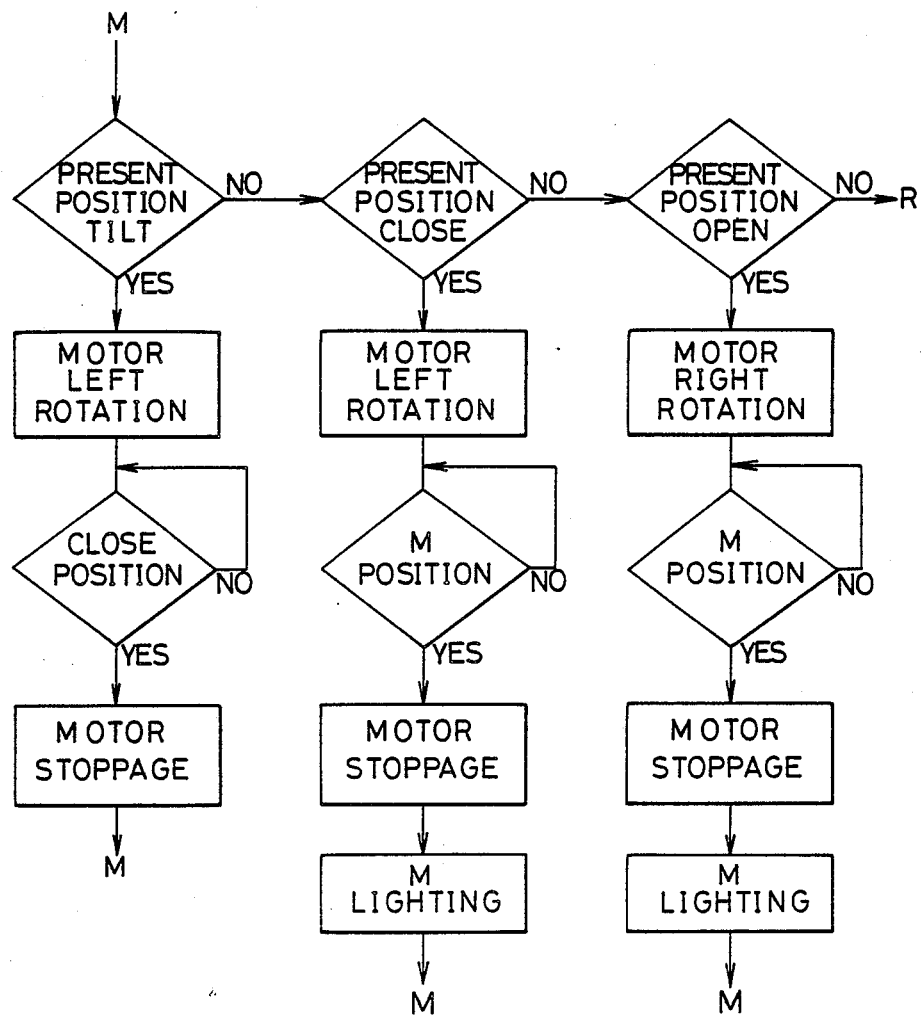

When the intermediate sliding operating switch 353 is operated, the control device proceeds to a route M in FIG. 30D. When the present position of the lid 312 is the completely closed position or the completely opening sliding position, the lid 312 is slided to take the intermediate sliding position, and the intermediate sliding position display lamp 344 is turned on. When the present position of the lid 312 is the completely opening tilting position, the lid 312 is tilted once and completely closed, and the control device returns to the route M, and the lid 312 is slided from the completely closed position to the intermediate sliding position, thereby opening the lid 312.

Figure 30E:
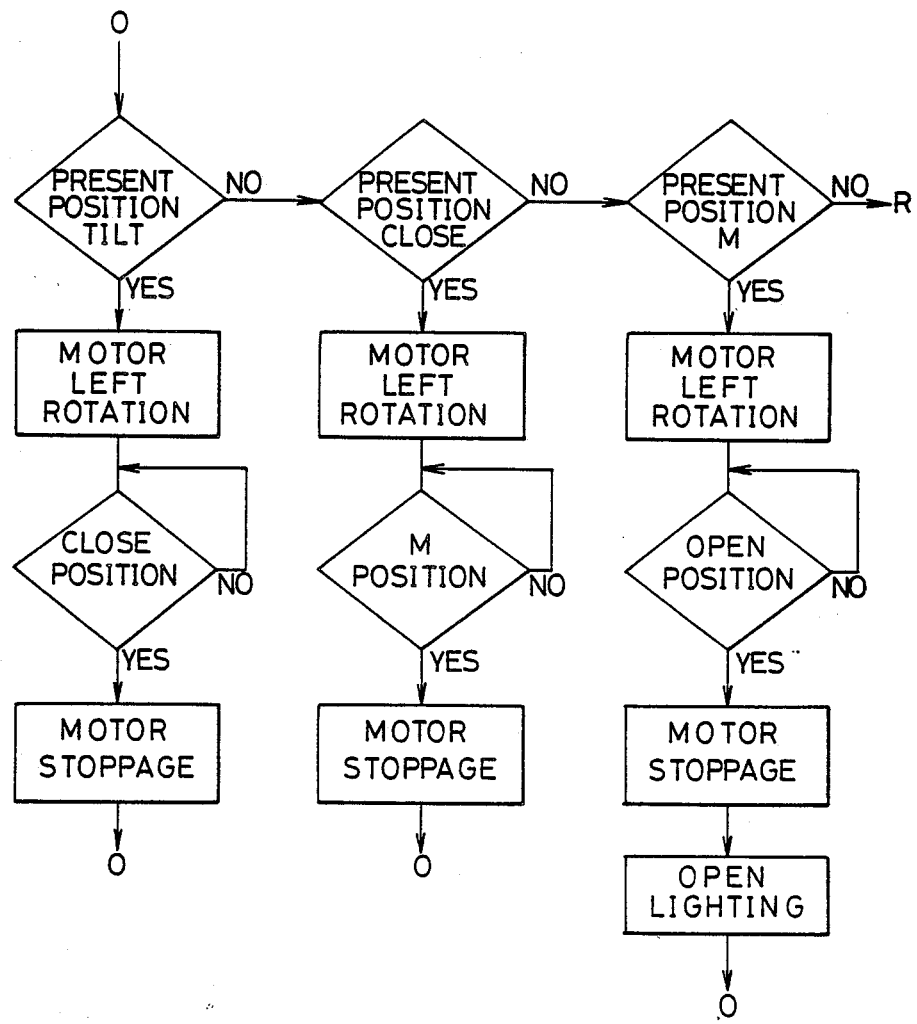

When the completely opening sliding operating switch 354 is operated, the control device proceeds to a route O in FIG. 30E. When the lid 312 takes the intermediate sliding position, the lid is slided to the completely opening sliding position in which the lid is completely open, turning on the the completely opening sliding position display lamp 345. When the lid 312 takes the completely closed position, the lid 312 is once slided to the intermediate sliding position, and the control device returns to the route R and the lid is completely open according to the route mentioned above. When the lid 312 takes the completely opening tilting position, the lid 312 is completely closed once, and is slided to take the intermediate sliding position according to the route mentioned above, and is further completely open.

In the embodiments mentioned above, two cam plates are disposed to transmit a two-bit signal, but more than three cam plates may be disposed to control the lid more precisely.

As mentioned above, according to a control device for a sunroof in the present invention, the state of a lid is presented by a bit signal without using an electrical memory means, and the lid can be moved from the present position thereof to a desired position by a simple operation based on the bit signal. Accordingly, it is not necessary to provide a complicated structure for maintaining the memory, and there is no fear that the memory is deleted, and the structure is simple, reliable and cheap, and the lid is reliably controlled.

What is claimed is:

1. A drive apparatus of a roof structure for a vehicle, said apparatus comprising:
    a positionable lid disposed in the roof structure;
    a drive gear system rotatably supported by a casing of the apparatus;
    a first transmission gear drive means for opening and closing the lid;
    switch means having a plurality of switches stacked with respect to each other and attached to the casing by attachment means;
    a second transmission gear control means including a rotary member having a plurality of stacked rotary control surfaces thereon, each surface in controlling contact with a respectively positioned one of the switches for switching the switches to detect the position of the lid, said plurality of control surfaces being disposed in upward and downward positions of the outer circumferences of the rotary member such that positions of all of the switches are completely adjusted by determining only one of the positions thereof at the attachment means;
    a motor;
    a main gear and a main shaft, disposed in said drive gear system; and
    means for connecting the motor, the main gear and the main shaft; wherein
    said motor being connected to drive the main shaft through the main gear, said first and second transmission gear means being driven by the motor through said means for connecting;
    said rotary member being disposed such that the rotary member does not overlap and does not underlap the main gear and the first transmission gear drive means.

2. A drive apparatus as claimed in claim 1, wherein said control surfaces are projected from an outer circumference of the rotary member.

3. A drive apparatus claimed in claim 1, wherein said lid is tilted and slidably moved by the first transmission gear drive means so as to open and close the lid.

4. An apparatus for driving a roof structure of a vehicle, said apparatus comprising:
    a positionable lid disposed in the roof structure;
    a drive gear system rotatably supported by a casing of the apparatus and having:
    a first transmission gear drive means for opening and closing the lid;
    switch means having a plurality of switches stacked with respect to each other and attached to the casing by attachment means;
    a second transmission gear control means including a rotary member having a plurality of stacked rotary control surfaces thereon, each surface in controlling contact with a respectively positioned one of the switches for switching the switches to detect a position of the lid, said plurality of stacked control surfaces being disposed in upward and downward positions of the outer circumference of the rotary member such that positions of all of the switches are completely adjusted by determining only one of the positions thereof at the attachment means;

a drive motor for slidably and tiltably driving the lid in response to rotations of the drive motor;

a tilting control circuit having first and second tilting contacts disposed in a first one of said switches, and operative for tilting the lid by directionally driving the drive motor by switching between the first and second tilting contracts when the first one of said switches is operated; and a sliding control circuit having first and second sliding contacts disposed in a second one of said switches, and operative for sliding the lid by directionally driving the drive motor by switching between the first and second sliding contacts when the second one of said switches is operated, wherein said rotary member being disposed such that the rotary member does not overlap and does not underlap the main gear and the first transmission gear drive means.

5. An apparatus as claimed in claim 4, wherein said switch means includes switching terminal means for contacting said control surfaces.

* * * * *